United States Patent
Bull et al.

(10) Patent No.: US 7,968,068 B2
(45) Date of Patent: *Jun. 28, 2011

(54) ZEOLITE CATALYST WITH IMPROVED NOX REDUCTION IN SCR

(75) Inventors: Ivor Bull, Cranford, NJ (US); Ahmad Moini, Princeton, NJ (US); Gerald Stephen Koermer, Basking Ridge, NJ (US); Joseph Allan Patchett, Basking Ridge, NJ (US); William Michael Jaglowski, West Orange, NJ (US); Stanley Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,663

(22) Filed: Jan. 13, 2010

(65) Prior Publication Data

US 2010/0172814 A1  Jul. 8, 2010

Related U.S. Application Data (63) Continuation of application No. 11/639,182, filed on Dec. 14, 2006, now Pat. No. 7,704,475.

(60) Provisional application No. 60/750,261, filed on Dec. 14, 2005.

(51) Int. Cl.
B01D 53/56 (2006.01)

(52) U.S. Cl. .............. 423/239.2; 423/700; 423/713; 502/34; 502/55; 502/60; 502/74; 502/85

(58) Field of Classification Search .............. 423/239.2, 423/700, 713; 502/34, 55, 60, 74, 85
See application file for complete search history.

(56) References Cited

U.S. PATENT DOCUMENTS

| | | |
|---|---|---|
| 3,895,094 A | 7/1975 | Carter et al. |
| 4,052,337 A | 10/1977 | Nishikawa et al. |
| 4,297,328 A | 10/1981 | Ritcher et al. |
| 4,735,930 A | 4/1988 | Gerdes et al. |
| 4,748,012 A | 5/1988 | Weber et al. |
| 4,946,659 A | 8/1990 | Held et al. |
| 5,041,270 A | 8/1991 | Fujitani et al. |
| 5,041,272 A | 8/1991 | Tamura et al. |
| 5,085,840 A | 2/1992 | Held et al. |
| 5,143,707 A | 9/1992 | Beck et al. |
| 5,160,033 A | 11/1992 | Vassilakis et al. |

(Continued)

FOREIGN PATENT DOCUMENTS

DE 4443301 A1 6/1996

(Continued)

OTHER PUBLICATIONS

PCT International Search Report for PCT/US06/04771, (Jun. 19, 2007).

(Continued)

*Primary Examiner* — Timothy C Vanoy
(74) *Attorney, Agent, or Firm* — Bernard Lau; Melanie Brown (57) ABSTRACT

The present invention is directed to a novel metal-promoted zeolite catalyst, a method of producing the catalyst and a method of using the catalyst for the selective catalytic reduction of $NO_x$ with improved hydrothermal durability. The novel metal-promoted zeolite is formed from a low sodium zeolite and is hydrothermally treated after metal ion-exchange.

19 Claims, 2 Drawing Sheets

U.S. PATENT DOCUMENTS

| | | | |
|---|---|---|---|
| 5,270,024 | A | 12/1993 | Kasahara et al. |
| 5,417,949 | A | 5/1995 | McWilliams et al. |
| 5,482,692 | A | 1/1996 | Audeh et al. |
| 5,520,895 | A | 5/1996 | Sharma et al. |
| 5,536,483 | A | 7/1996 | Descat et al. |
| 5,589,147 | A | 12/1996 | Farnos et al. |
| 5,776,324 | A | 7/1998 | Usala |
| 6,171,556 | B1 | 1/2001 | Burk et al. |
| 6,221,324 | B1 | 4/2001 | Coq et al. |
| 6,689,709 | B1 | 2/2004 | Tran et al. |
| 6,914,026 | B2 | 7/2005 | Tran et al. |
| 7,118,722 | B2 | 10/2006 | Tran et al. |
| 7,704,475 | B2 * | 4/2010 | Bull et al. .................. 423/239.2 |
| 2004/0053773 | A1 | 3/2004 | Sarkar et al. |
| 2004/0109805 | A1 | 6/2004 | Schwefer et al. |
| 2008/0044331 | A1 | 2/2008 | Schwefer et al. |

FOREIGN PATENT DOCUMENTS

| | | |
|---|---|---|
| EP | 393917 A2 | 4/1990 |
| WO | WO-2004/002611 A1 | 1/2004 |
| WO | WO-2004/047960 A1 | 6/2004 |

OTHER PUBLICATIONS

Seiyama, T. et al., "Catalytic Activity of Transition Metal Ion Exchanged Y Zeolites in the Reduction of Nitric Oxide with Ammonia", *Journal of Catalysis 48*, (1977), 1-7.

Gross, TH. et al., "Surface Composition of Dealuminated Y Zeolites Studied by X-Ray Photoelectron Spectroscopy", *Zeolites* vol. 4, (Jan. 1984), 25-29.

Ward, M. et al., "Enrichment of Structural Aluminum at the External Surface of Ultrastable Zeolite-Y", *Journal of Catalysis 87*, (1984), 524-527.

Stach, H. et al., "Adsorption Equilibria of Hydrocarbons on Highly Dealuminated Zeolites", *Zeolites 6*, (1986), 74-90.

Miessner, H. et al., "Characterization of Highly Dealuminated Faujasite-Type Zeolites: Ultrastable Zeolite Y and ZSM-20", *Journal of Physical Chemistry*, vol. 97 (1993), 4741-4748.

Beyerlein, R. A., et al., "Effect of Steaming on the Defect Structure and Acid Catalysis of Protonated Zeolites", *Topics in Catalysis 4*, (1997),27-42.

Kieger, S. et al., "Selective Catalytic Reduction of Nitric Oxide by Ammonia Over CU-FAU Catalysts in Oxygen-Rich Atmosphere", *Journal of Catalysis 183*, (1999), 267-280.

Delahay, G. et al., "The Origin of N2O Formation in the Selective Catalytic Reduction of NO by NH3 in O2 Rich Atmosphere on CU-Faujasite Catalysts", *Catalysis Today 54*, (1999), 431-438.

Torre-Abreu, C. et al., "Selective Catalytic Reduction of NO on Copper-Exchanged Zeolites: The Role of the Structure of Zeolite in the Nature of Copper-Active Sites", *Catalysis Today 54*, (1999), 407-418.

Richter, M. et al., "Zeolite-Mediated Removal of NOx by NH3 From Exhaust Streams at Low Temperatures", *Catalysis Today 54*, (1999), 531-545.

Van Kooten, W. E., et al., "Hydrothermal Deactivation of Ce-Zsm-5, Ce-mordenite and Ce-Y Zeolite deNOx Catalysis", *Catalysis Letters 63*, (1999), 227-231.

Triantafillidis, C.S. et al., "Dealuminated H-Y Zeolites: Influence of the Degree and the Type of Dealumination Method on the Structural and Acidic Characteristics of H-Y Zeolites", *Ind. Eng. Chem. Res. 39*, (2000), 307-319.

Kieger, S. et al., "Influence of CO-Cations in the Selective Catalytic Reduction of NO by NH3 Over Copper Exchanged Faujasite Zeolites", *Applied Catalysis B: Enviornmental 25*, (2000), 1-9.

Kuehl, G. H., et al., "Acid Sites in Zeolite Beta: Effects of Ammonium Exchange and Steaming", *Microporous and Mesoporous Materials 35-36*, (2000), 521-532.

Bulanek, R. et al., "Reducibility and Oxidation Activity of CU Ions in Zeolites Effect of Cu Ion Coordination and Zeolite Framework Composition", *Applied Catalysis B: Enviornmental 31*, (2001), 13-25.

Janssen, A. et al., "Three-Dimensional Transmission Electron Microscopic Observations of Mesopores in Dealuminated Zeolite Y", *Chem. Int. Ed. 40, No. 6*, (2001), 1102-1104.

Delahay, Gerard et al., "Kinetics of the Selective Catalytic Reduction of NO By NH3 on a Cu-Fajuasite Catalyst", *Applied Catalysis B: Enviornmental 52*, (2004), 251-257.

Li, L. et al., "Direct Synthesis of Zeolite Coatings on Cordierite Supports by in Situ Hydrothermal Method", *Applied Catalysis A: General 292*, (2005), 312-321.

Li, M. et al., "Low Activation Energy Pathway for the Catalyzed Reduction of Nitrogen Oxides to N2 by Ammonia", *Catalysis Letters*, vol. 09, Nos. 1, (2004), 5-9.

Berger, C. et al., "The Synthesis of Large Crystals of Zeolite Y Re-visited", *Microporous and Mesoporous Materials 83*, (2005), 333-344.

Yeom, Y. H., et al., "The Role of NO in the Mechanism of NOx Reduction with Ammonia Over a BaNa-Y Catalyst", *Journal of Catalysis 231*, (2005), 181-193.

Dimitrijevic, R. et al., "Hydrothermal Stability of Zeolites: Determinationof Extra-Framework Species of H-Y Faujasite-Type Steamed Zeolite", *Journal of Physics and Chemistry of Solids 67*, (2006), 1741-1748.

Kerr, G. T., "Determination of Framework Aluminum Content in Zeolites X. Y, and Dealuminated Y Using Unit Cell Size", *Zeolites*, vol. 9, (Jul. 1989),350-351.

Winiecki, Ann M., et al., "X-Ray Photoelectron Spectroscopy Investigations of Zeolites", *Langmuir* 4, (1988), 512-518.

Lynch, J. "Development of Structural Characterization Tools for Catalysts", *Oil & Gas Science and Technology*, vol. 57, No. 3, (2002), 281-305.

Barger, P. T. "Hydrothermal Stability of Sapo-34 in The Methanol-to-Olefins Process", *The Arabian Journal of Science and Engineering*, vol. 21, No. 2, (Apr. 1996), 263-272.

English Translation of DE 4443301 A1—Cited in PCT Search Report & Written Opinion mailed Jun. 19, 2007, Reference Date—Dec. 6, 1994, 4 pages.

* cited by examiner

Fig. 2

ZEOLITE CATALYST WITH IMPROVED NOX REDUCTION IN SCR

CROSS REFERENCE TO RELATED APPLICATIONS

This application is a continuation of U.S. Ser. No. 11/639,182, filed Dec. 14, 2006, now U.S. Pat. No. 7,704,475, which claims priority to U.S. Provisional Application No. 60/750,261, filed Dec. 14, 2005, both of which are incorporated herein by reference.

BACKGROUND

1. Field

The present invention is concerned with a method of catalyzing the reduction of nitrogen oxides with ammonia, especially the selective reduction of nitrogen oxides, with ammonia in the presence of oxygen, using zeolite catalysts, especially metal-promoted zeolite catalysts. The invention is also directed to hydrothermally stable zeolite catalysts and methods of making same.

2. The Related Art

Over many years the harmful components of nitrogen oxides (NOx) contained in exhausted gases such as from internal combustion engines, for example, automobiles and trucks, from combustion installations, for example in power stations heated by natural gas, oil or coal, and from nitric acid production plants, have caused atmospheric pollution, and accordingly, various methods of reducing nitrogen oxides from such exhausted gases have been investigated.

Different methods have been used in the treatment of NOx-containing gas mixtures. One type of treatment involves the catalytic reduction of nitrogen oxides. As typical processes for removing nitrogen oxides from flue gas by catalytic reduction, there can be mentioned two processes: (1) a nonselective reduction process wherein carbon monoxide, hydrogen or a lower hydrocarbon is used as the reducing agent and (2) a selective reduction process wherein ammonia is used as the reducing agent. In the latter process (selective reduction process with ammonia), a high degree of removal with nitrogen oxide can be obtained with a small amount of reducing agent. Therefore, this process has become of major interest and several variations have been proposed.

The selective reduction process (2) is known as the SCR process (Selective Catalytic Reduction). The SCR process uses the catalytic reduction of nitrogen oxides with ammonia in the presence of atmospheric oxygen with the formation predominantly of nitrogen and steam:

$$4NO + 4NH_3 + O_2 \rightarrow 4N_2 + 6H_2O \quad (1)$$

$$2NO_2 + 4NH_3 + O_2 \rightarrow 3N_2 + 6H_2O \quad (2)$$

$$NO + NO_2 + NH_3 \rightarrow 2N_2 + 3H_2O \quad (3)$$

The processes for catalytic reduction of nitrogen oxides with ammonia as the reducing agent which have been proposed so far can be divided roughly into two groups: (1) processes using a catalyst wherein the active ingredient is a noble metal such as platinum or palladium and (2) processes using a catalyst wherein the active ingredient is a compound of a base metal, particularly a non-noble transition metal, such as copper, iron, vanadium, chromium and molybdenum. The active ingredients of these catalysts are carried generally on alumina. Noble metal catalysts are less desired because (1) the temperature window of activity is very narrow and limited at high temperature by $NH_3$ oxidation to NOx, and (2) because there is a tendency to form large quantities of $N_2O$. On the other hand, the base metal catalysts are less active at low temperature for the catalytic reduction of nitrogen oxides. Therefore, elevation of reaction temperature and reduction of pace velocity have been required. In modem diesel engine applications the quantity of exhaust gas to be treated is large and temperature of the exhaust gas is low in general. Therefore, development of a highly active catalyst that can be used under reaction conditions of low temperature and high space velocity is desired.

The art thus shows an awareness of the utility of metal-promoted zeolite catalysts including, among others, iron-promoted and copper-promoted zeolite catalysts, for the selective catalytic reduction of nitrogen oxides with ammonia. There is a desire to prepare materials that offer improved hydrothermal durability, where these catalysts are required to be stable at temperatures of 800° C. with the presence of steam. The 800° C. hydrothermal stability is a unique requirement for SCR catalysts that are used in diesel exhausts in the presence of a soot filter, where high temperature exposure is part of the soot regeneration cycle.

High-silica zeolitic materials are more resistant to dealumination when exposed to high temperature hydrothermal conditions. In addition, sodium containing zeolites promote dealumination at high temperatures and so low sodium contents associated with high silica zeolites provide more hydrothermal durability but can have lower ion-exchange capacity, depending on calcination history of the zeolite. Often, such high silica materials have lower metal loadings and less activity. In addition, the high silica materials have proven to be more problematic to exchange with high levels of desired metals. Zeolite Y exchanged with copper is a material which has found application in this field, although this material has historically suffered from poor hydrothermal durability due to dealumination of the zeolite framework, coupled with copper migration.

There are U.S. patents and much non-patent literature directed to formation of Cu-zeolites and use thereof in SCR. Examples of U.S. patents include U.S. Pat. No. 4,748,012 which teaches a process for reducing the nitrogen oxide content in a waste gas of a combustion installation by catalytic reductions with ammonia by contacting the nitrogen oxide-containing waste gas with temperature-resistant surface structures which are coated to a thickness of 0.1 to 2 mm with a mixture of one or more crystalline aluminosilicate zeolites of the faujasite group, silica sol and/or silicates as binder and a copper compound and the catalytic reduction is carried out in the temperature range of from about 100 to about 250° C.

U.S. Pat. No. 4,052,337 describes the use of different catalysts of the zeolite type, in particular zeolite Y to reduce the $NO_x$ with $NH_3$. This catalyst is intended for use at relatively high temperatures to reduce nitrogen oxides containing sulfur, is effective only if it is prepared by a process carrying out a preliminary exchange of zeolite with alkaline earth ions followed by an impregnation by metal ions, in particular cupric ions.

U.S. Pat. No. 5,536,483 recites a process for the treatment of oxygenated effluents comprising $NO_x$ to reduce nitrogen oxides contained therein by contacting the effluents with a catalytically effective amount of a composition comprising 70 to 90% of an $NH_4$ zeolite Y catalyst having a specific surface area of between 750 and 950 $m^2/g$ exchanged with cupric ions, wherein the copper content is between 2 and 12% relative to the weight of the zeolite; and 10 to 30% of a binder; wherein the zeolite material used to produce the zeolite catalytic composition comprises a super-cage type zeolite which contains cavities having a diameter of about 13 angstroms which communicate with each other through openings having a diameter of about 8-9 angstroms which make up the pores of the zeolite lattice.

While zeolitic catalysts, in general, and Cu-zeolites, in particular have found use in the selective catalytic reduction of NOx, there is still a need to provide such materials that offer improved high temperature (>700° C.) hydrothermal durability, specifically for diesel applications with a soot filter. There is a need to combine the activity that sufficient loadings of copper provide and at the same time provide the stability of high silica zeolites and allow efficient methods of exchanging such zeolites.

SUMMARY

This invention provides the synthesis of a novel metal-promoted zeolite catalyst with improved selective catalytic reduction of $NO_x$ with $NH_3$. The metal-promoted zeolite provides good performance and is hydrothermally stable, maintaining high activity. The novel metal-promoted zeolite is formed from a low sodium zeolite and is hydrothermally treated after metal ion-exchange. While not wishing to be bound to any one theory of improvement, it is believed the metal exchange under acidic conditions and the hydrothermal treatment improves the catalytic performance of the zeolite.

DETAILED DESCRIPTION

The present invention relates to a process for reduction of nitrogen oxides, the catalyst used therein and a process for preparing this catalyst. More particularly, the invention relates to a catalyst for reducing and thereby removing nitrogen oxides from an engine exhaust or flue gas containing nitrogen oxides by selective catalytic reduction.

The present invention further relates to a catalyst and a process for production thereof for the reduction of nitrogen oxides in engine exhaust or flue gas, which catalyst comprises a metal ion exchanged onto a crystalline aluminosilicate carrier such as zeolite.

The process for preparing the metal-promoted zeolite catalyst for reduction of nitrogen oxides, involves contacting a low sodium, synthetic crystalline aluminosilicate, e.g., zeolite Y, with a medium containing metal ion, e.g., copper, under acidic conditions to ion-exchange the sodium, hydrogen and/or ammonium cations in the synthetic crystalline aluminosilicate with the metal. The metal may be introduced into the zeolite by wet ion-exchange, solid state exchange, impregnation or precipitation. In one embodiment, after metal ion-exchange some or all of the metal may be present as a metal oxide. The metal-exchanged synthetic crystalline aluminosilicate is then hydrothermally treated. It has been found that the metal-zeolite prepared in this manner unexpectedly has improved activity for SCR as well as improved hydrothermal stability so as to maintain and even enhance the activity relative to a non-hydrothermally treated catalyst. In one embodiment, the hydrothermally treated metal-exchanged zeolite catalyst of the present invention has improved low temperature activity for the reduction of NOx, when compared with a catalyst which has not been treated by the hydrothermal treatment process of the present invention. In particular, the catalyst has improved NOx reduction activity at low temperatures when compared to a metal-exchanged zeolite which has not been treated by the hydrothermal treatment disclosed herein. As used herein "low temperatures" means temperatures at or below about 350° C. Improved NOx reduction activity at temperatures below about 300° C., below about 250° C., below about 200° C., and below about 150° C., are also exemplified. In another embodiment, the hydrothermally treated metal-exchanges zeolite catalyst of the present invention can catalyze the conversion of greater than 50% of contaminating $NO_x$ gases in an exhaust or flue gas stream at temperatures at or below about 250° C. In yet another embodiment, the hydrothermally treated metal-exchanged zeolite catalyst of the present invention can catalyze the conversion of greater than 80% of contaminating NOx gases in an exhaust or flue gas stream at temperatures at or below about 300° C.

Especially preferred crystalline aluminosilicates are those having a pore diameter in the range of about 3-14 angstroms and having a $SiO_2/Al_2$—$O_3$ molar ratio of about 2-150. For example, synthetic faujasites, zeolite Y, having a pore diameter of about 7.4-9 angstroms and $SiO_2/Al_2$—$O_3$ molar ratios of about 2-80 and 4-30 are preferred. Also, suitable for the invention are the zeolites of the families of cubic faujasite (FAU), hexagonal faujasite EMT, intergrowths of the cubic faujasite (FAU) and hexagonal faujasite (EMT). In addition, other zeolitic materials including but not limited to ultrastable Y, ZSM-3, ZSM-20, CSZ-1, ECR-30, LZ-210, zeolite L, ferrierite, MCM-22, and offretite are also suitable for the invention.

In accordance with the present invention, a zeolite is first promoted with a metal by metal ion-exchange. In general, any known metal may be used. For example, the zeolite of the present invention may be ion-exchanged with a metal ions selected from the group consisting of vanadium (V), chromium (Cr), manganese (Mn), iron (Fe), cobalt (Co), nickel (Ni), copper (Cu) and cerium (Ce). In one embodiment the use of zeolite Y and copper may be preferred. However, it will be appreciated by one of skill in the art that other metal ions and other zeolites, as described hereinabove, can be used in place of copper and zeolite Y.

The first characteristic feature of the reduction catalyst for nitrogen oxides according to the present invention is that the crystalline aluminosilicate can be treated so as to reduce the amount of alkali metal in the zeolite so as to enhance further ion exchange with the metal, e.g., copper. Thus, initially, the formed zeolite can be acid treated or treated under ammonium cation exchange to reduce the sodium level of the zeolite by methods well known in the art. Specifically, the alkali metal, namely, sodium, in the crystalline aluminosilicate is reduced during acid or ammonium exchange to a level generally less than 5 wt. %. All sodium levels are reported on a metal oxide basis. Sodium levels of less than 3 wt. % in the crystalline aluminosilicate zeolite are useful to enhance the subsequent cation exchange with metal ions, e.g., copper ions. In one embodiment, sodium levels of greater than 0.4 wt. % may be preferred. In another embodiment, sodium levels of less than 0.4 wt. % may be preferred for high temperature (>700° C.) durability of the catalyst. The ion exchange for loading copper into the zeolite can be effected by contacting the zeolite with an aqueous solution containing a copper ion. In general, any copper salt can be used to provide the copper ion including copper nitrate, copper acetate, copper sulfate, etc. It is believed the pH control of the exchange solution is beneficial to the improved activity and stability that is found in the completed catalyst. Too acidic a pH (<2.5) can result in significant dealumination of the zeolitic framework whereas too high a pH (>5) limits the solubility of $Cu^{2+}$ cation. By using a low sodium zeolite, and adjusting the zeolite solids content in the exchange solution, the pH of the solution can be controlled. If the sodium content of the zeolite is elevated, addition of acid may be needed to reduce the pH. A pH of less than 5.0 can be readily achieved by adjusting the zeolite solids concentration in the exchange solution. Exchange solution pHs of from about 2.0 to about 3.5, from about 2.5 to about 3.5, and from about 3.0 to about 3.5 are also exemplified.

In the ion exchange, an aluminosilicate having the desired low sodium content is immersed in a stirred aqueous solution containing the copper salt. Contact of the zeolite with the exchange solution is generally maintained for about 0.5 to 2 hours. Concentration of the copper cation in the aqueous solution, contact time and amount of the aluminosilicate used for the ion-exchange are selected such that the copper loading on the zeolite is at least 1.0 wt. %. Loadings of copper greater than 3.5 wt. %, from about 4.0 to about 14.0 wt. %, and from about 4.0 to about 6.0 wt. %, based on the weight of the cation-exchanged zeolite are also exemplified. All copper loadings are expressed as wt. % of the metal oxide on a volatile free basis. Copper exchange can take place in one step or multiple steps in which the zeolite is exchanged in solution, washed, dried and reslurried in the copper-containing exchange solution. In another embodiment, one or more calcinations may be carried out between metal ion-exchanges to improve ion-exchange efficiency. For example, following the metal exchanges the zeolite can be calcined from about 300-800° C. for 1 to 20 hours, prior to a subsequent or second metal ion-exchange step. Further, it is believed that sodium is a mobile cation and can adversely enhance dealumination during the hydrothermal treatment. Significant removal of aluminum sites from the zeolitic framework can adversely reduce the copper loading therein with consequent loss in structural integrity and SCR activity. However, low sodium content is important because it may increase the thermal stability of zeolite. This invention is unique because it allows for relatively high framework aluminum levels, low sodium content, high exchange capacity, and high hydrothermal stability. Accordingly, sodium contents after copper exchange should generally be less than 3.0 wt. % as sodium. Levels of sodium less than 2.4 wt. %, less than 1.0 wt. % and less than 0.4 wt. % are also exemplified. All sodium levels are expressed as wt. % $Na_2O$ on a volatile free basis. The minimization of sodium results in a lower level of dealumination during aging, and thus, results in a minimization of deactivation due to aging of the catalyst.

The aluminosilicate ion-exchanged with copper ion is washed to remove excess copper ions that are not exchanged into the zeolite and then dried at low temperature of less than 100° C. Subsequent to drying, the Cu-zeolite is calcined in air at a temperature in the range of about 300-850° C., preferably about 350-600° C. for 1 to 20 hours.

Importantly, after calcination, the Cu-zeolite, such as Cu—Y, is hydrothermally treated. The hydrothermal treatment has been demonstrated to result in migration of aluminum and associated copper to the surface of the zeolite. This migration to the zeolite surface may account for the continued activity of the catalyst even under the hydrothermal conditions of SCR. The temperature of steam treatment is at least 540° C., with temperature ranges of from about 540° to about 1000° C., and from 700-800° C. being exemplified. The steam concentration usually in air can range from about 1% to about 100%, typically, from about 5% to about 50% steam, with 10% steam also exemplified, the balance of being air. In another embodiment, the hydrothermal treatment comprises at least about 10% steam, at least about 15% steam, at least about 20% steam, or at least about 25% steam. The steaming is preferably conducted at atmospheric pressure. The duration of hydrothermal treatment will be, in general, from about 5 minutes to about 250 hours. Hydrothermal treatment at the conditions set forth above, are also exemplified at durations of at least 1 hour, greater than 2 hours, greater than 5 hours, and greater than 10 hours. Hydrothermal treatments of from about 1 hour to about 50 hours, from about 2 hours to about 20 hours and from about 2 hours to about 10 hours are also exemplified.

It has been discovered that the hydrothermal treatment of the present invention results in the production or formation of extra-framework aluminum and migration of that extra-framework aluminum within the zeolite crystal structure. Extra-framework aluminum is defined as aluminum which is not an integral part of the tetrahedral zeolitic framework (i.e. it is non-framework). Extra-framework aluminum can reside within the zeolite pores or at the external surface of the zeolitic crystal. As used herein, the "external surface" of the zeolitic crystal means within 20 to 100 nm of the external surface of the crystal. Extra-framework aluminum has been reported to block the microporosity of the zeolite and can hide active metal sites. Thus, it is an important discovery of the present invention that when the metal-exchanged zeolite is hydrothermal treated, in accordance with the present invention, the resulting extra-framework aluminum formed migrates from the zeolite pores to the external surface of the zeolite. In one embodiment, a major portion of the extra-framework aluminum is removed from the pores. As used herein, "a major portion" removed from the pores means that greater than 65% of the total aluminum is removed from the zeolitic pores. In another embodiment, less than 7.5 wt. % of the total extra-framework aluminum resides in the pores. In yet another embodiment, less than 35% of the total aluminum resides in the pores of the zeolite. Furthermore, it has been discovered that calcination of the metal-promoted zeolite of the present invention helps to promote migration of the extra-framework aluminum to the external surface of the zeolite crystal. In addition to extra-framework aluminum migration, migration of the ion-exchanged metal may also seen. In one embodiment, metal (e.g., copper) loading at the external surface of the zeolite may be from about 1 wt. % to about 10.0 wt. %, expressed as the metal oxide and based on the total weight of the metal-exchanged zeolite. Metal loadings at the external surface of from about 1 wt. % to about 5 wt. %, expressed as the metal oxide, are also exemplified.

The location of aluminum in the zeolite can be assessed via a combination of techniques. Unit cell data, obtained from x-ray diffraction, can be used to define the amount of aluminum which is part of the zeolite framework. The amount of extra-framework aluminum can then be calculated when this information is combined with bulk chemical analysis. See, for example, Table 1 of Example 6. Differentiating the location of extra-framework aluminum can be done with the addition of a surface sensitive technique which reflects the removal of extra-framework aluminum from the zeolite pores to the external surface. The surface composition of dealuminated Y zeolites can be studied by x-ray photoelectron spectroscopy (XPS) to provide an estimate of the increase in surface aluminum. Although XPS can often see the bulk composition of the studied material, it can be used to track surface enrichment of aluminum caused by the migration of aluminum out of the zeolite pores when compared to the framework aluminum content. As a result any net change at the surface can be used to quantify the amount of extra-framework aluminum that still resides in the pores. This technique can be used when dealumination methods result in surface enrichment but cannot be used for methods which completely remove the extra-framework aluminum from the zeolite. An example of this situation would be acid extraction of aluminum by solubilizing extra-framework aluminum. In this situation a comparison of unit cell with chemical analysis may be enough to determine the maximum amount of extra-framework aluminum which resides in the pores.

Another characteristic associated with removal of extra-framework aluminum from the pores to the external surface is mesoporosity. Synthesized zeolites have micropore structures which are a characteristic of their zeolite structure. For instance, zeolite Y has a 12 member ring micropore which is ~0.74 nm is diameter. Mesoporosity can be introduced into zeolitic materials via different treatments which extract aluminum from the framework and out of the micropores and eventually results in mesoporosity via structural collapse. A mesoporous material is a material containing pores with diameters between 2 and 50 nm and having a pore volume of at least 0.07 $cm^3/g$ (referred to herein as mesopores). A mesopore volume of from about 0.07 $cm^3/g$ to about 0.22 $cm^3/g$ is also exemplified. Aluminum extracted from the zeolite lattice causes an eventual partial collapse of the framework via which extra-framework aluminum can migrate more easily to the external surface.

In another embodiment, the zeolite can be treated prior to metal ion-exchange to dealuminate the zeolite. In general, any known method of dealumination can be used. For example, the zeolite can be dealuminated by known methods of acid dealumination, such as, chemical dealumination such as treatment with $(NH_4)_2SiF_6$, steam dealumination or by extraction of extra-framework aluminum with a complexing agent, such as ethylenediaminoetetra acetic acid (EDTA). These treatments may also result in the production of extra-framework aluminum which may block the pores and thus the metal active sites of the zeolite.

The crystalline aluminosilicates according to the present invention may be incorporated with about 1-30 wt. % of at least another refractory material, i.e. inorganic oxide such as alumina, magnesia, titania, zirconia, hafnia, silica or diatomatceous earth. In the preparation of molded catalyst products, a binder such as alumina or silica sols may be added in a suitable amount such as about 2-40 wt. %.

The Cu-zeolite may be deposited or coated onto a substrate, such as a solid monolithic carrier, by methods known in the art and used to treat an exhaust gas stream containing NOx. It is usually most convenient to apply the Cu-zeolite as a thin film or coating deposited on an inert carrier material which provides the structural support for the catalyst. The inert carrier material can be any refractory material such as ceramic or metallic materials. Alternatively, as is known in the art, the catalyst may be provided in the form of pellets or beads disposed in a flow-through canister to provide a catalyst bed through which the exhaust gases flow. For employing the catalyst of the present invention in the reduction of nitrogen oxides contained in the exhaust gas, pellets or beads can be adopted any shape such as cylindrical, spherical or Raschig ring shape having a large contact surface in which gas flow is easy. In still other embodiments, the catalyst may be extruded or otherwise fabricated into monolithic form and disposed within the exhaust gas stream. The amount of catalyst used for SCR can be varied based on factors including the specific composition of the exhaust gas, the specific zeolite and binder combination and concentrations, the conditions of the stream containing the NOx and the like. Typically, a Cu-zeolite catalyst composition is in an aqueous slurry form having 5 to 50, preferably 10 to 40 weight percent solids, for use to coat a monolith, such as a honeycomb. The resultant monolith preferably is coated with the catalyst composition and preferably has from 0.3 to 5.0 $g/in.^3$ and preferably 1.5 to 3.0 $g/in^3$ of coating based on the amount of zeolite catalyst compound.

The catalyst of the present invention exhibits a remarkable effect in removing nitrogen oxides from a flue gas from a stationary source such as boiler or the like and from mobile sources such as motor vehicles and, in particular, vehicles powered by diesel engines. More particularly, nitrogen oxides can be reduced selectively by mixing engine exhaust or flue gas containing nitrogen oxides, sulfur oxides and oxygen with ammonia and then contacting the resulting gaseous mixture with the catalyst of the invention.

The reduction of nitrogen oxides with ammonia comprises conversion of nitrogen into innoxious nitrogen as shown by equations: (1), (2) and (3) above.

The catalyst of the present invention can be used together with any reducing agent that decomposes to ammonia, such as urea, since the particularly preferred reducing agent is ammonia.

The amount of ammonia to be added as reducing agent to exhaust gas should be more than about 0.7 times as much as stoichiometric amount required for reducing nitrogen oxides into completely innoxious nitrogen. In the case that a major part of nitrogen oxides is nitrogen monoxide (NO), about 1.0 moles of ammonia is required per mole of the nitrogen oxide.

Theoretically, it would be desirable in the SCR process to provide ammonia in excess of the stoichiometric amount required to react completely with the nitrogen oxides present, both to favor driving the reaction to completion and to help overcome adequate mixing of the ammonia in the gaseous stream. However, in practice, a significant excess of ammonia over the stoichiometric amount is normally not provided because the discharge of unreacted ammonia from the catalyst would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream. Channels of high ammonia concentration are formed in the gaseous stream by poor mixing and are of particular concern when utilizing catalysts comprising monolithic honeycomb-type carriers comprising refractory bodies having a plurality of fine, parallel gas flow paths extending therethrough because, unlike the case with beds of particulate catalysts, there is no opportunity for gas mixing between channels. It is, therefore, also desirable that the catalyst employed to catalyze the selective catalytic reduction of nitrogen oxides, be effective to catalyze the reaction of oxygen and ammonia, in order to oxidize excess or unreacted ammonia to $N_2$ and $H_2O$.

In general, the gaseous mixture of the amount of exhaust gas containing nitrogen oxide and reducing agent is contacted with the catalyst, for example as a fixed bed or coated monolith, at reaction conditions including a temperature of about 150° to 650° C., preferably about 250° to 500° C., and a gas space velocity of about 2,000-100,000 V/H/V, preferably about 10,000-60,000, and more preferably about 15,000 to 45,000 V/H/V. Thus, the invention provides a new catalyst for reduction of nitrogen oxides in the presence of oxygen and the method of preparation thereof. As compared with conventional catalysts, the catalyst of the invention exhibits excellent activity and selectivity and maintenance of activity under the 800° C. aging conditions of SCR, when used in an exhaust system requiring active regeneration of a soot filter.

The present invention will be illustrated by way of examples.

EXAMPLE 1

Catalyst A. Synthesis of Copper Zeolite Y. An ammonium form of a low sodium Y ($Na_2O<2.4$ wt %) was promoted with copper as follows:

A. 507.3 g of zeolite Y was added to 2523.77 g of an aqueous solution of copper (II) sulfate pentahydrate containing 0.24% by weight Cu (0.04 M Cu), with stirring to suspend the solids and disperse the lumps in a 4 liter Pyrex beaker.

B. With continued stirring, the slurry of Step A was heated to 80° C., for one hour, and then cooled. pH of the solution was not adjusted but was between 2.75 and 3.5 throughout the reaction.

C. The cooled slurry of Step B was vacuum filtered to separate the solids from the liquid, and the solids were washed with a volume of deionized water equal to the volume of the separated liquid.

D. The powder of Step C was dried for 4 hours at 90° C. in air to provide a copper promoted zeolite Y powder (CuY).

E. The CuY of Step D was reslurried (with continuous stirring) in the same copper solution as Step A before Step B through D was carried out again for a total of 5 exchanges. The pH of each exchange was between 2.75 and 3.5 throughout each reaction.

F. Following the final exchange, the powder was dried for sixteen hours at 90° C. in air to provide a copper promoted zeolite Y powder (CuY).

G. The CuY of Step F was then calcined for 16 hours at 640° C. Chemical analysis showed that the CuY powder contained 4.89% by weight Cu (expressed as the metal oxide on a volatile free basis) and 0.41 wt % $Na_2O$.

H. The calcined CuY was subsequently hydrothermally treated at 800° C. for 50 hours with 10% steam in air and designated Catalyst A.

EXAMPLE 2

Catalyst B. Synthesis of Copper Zeolite Y. An ammonium form of a low sodium Y ($Na_2O<0.2$ wt %) was promoted with copper as follows:

A. 4.375 kg of zeolite Y was added to 33.5 kg of an aqueous solution of copper (II) sulfate pentahydrate containing 1% by weight Cu (0.16 M Cu), with stirring to suspend the solids and disperse the lumps in a 4 liter Pyrex beaker.

B. With continued stirring, the slurry of Step A was heated to 80° C., for one hour, and then cooled. pH of the solution was not adjusted but was between 3 and 4 throughout the reaction.

C. The cooled slurry of Step B was vacuum filtered to separate the solids from the liquid, and the solids were washed with a volume of deionized water equal to the volume of the separated liquid.

D. The powder of Step C was dried for 4 hours at 90° C. in air to provide a copper promoted zeolite Y powder (CuY).

E. The CuY of Step D was reslurried (with continuous stirring) in the same copper solution as Step A before Step B through D was carried out again for a total of 2 exchanges for 1 hour each. The pH of each exchange was between 3 and 4 throughout the reaction.

F. Following the final exchange, the powder was dried for sixteen hours at 90° C. in air to provide a copper promoted zeolite Y powder (CuY).

G. The CuY of Step F was then calcined for 16 hours at 640° C. Chemical analysis showed that the CuY powder contained 4.75% by weight Cu (expressed as the metal oxide on a volatile free basis) and 0.1 wt % $Na_2O$.

H. The calcined CuY was subsequently hydrothermally treated at 800° C. for 50 hours with 10% steam in air and designated Catalyst B.

EXAMPLE 3

Figure 1:
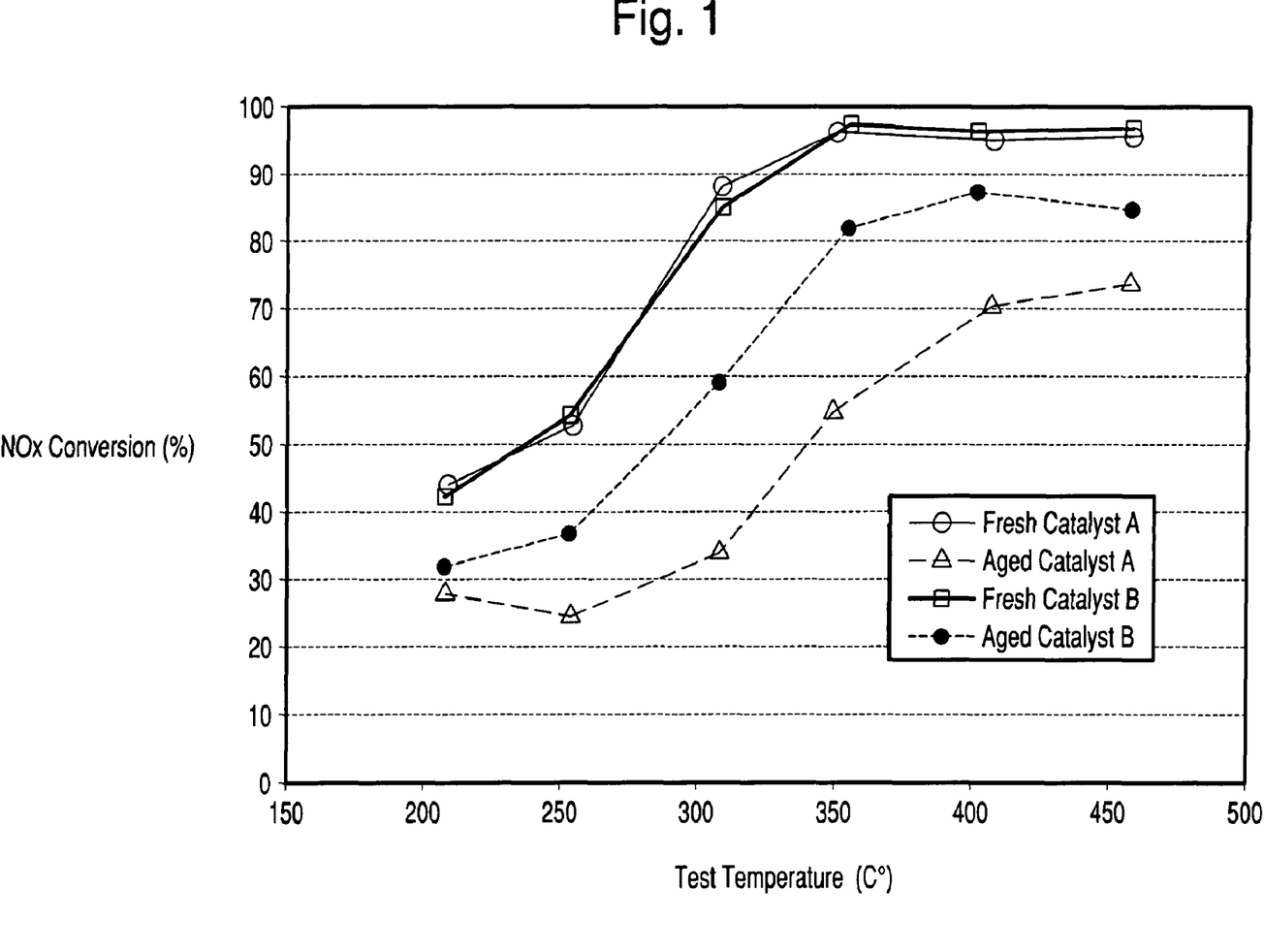
FIG. 1 is a comparison of two copper zeolite Y catalysts with differing sodium contents.

The Copper zeolite catalysts of Examples 1 and 2 were used to coat honeycombs in an amount of about 2-2.5 g/in³. The catalysts were then tested for $NH_3$ SCR reduction of NOx in a lab reactor. The feed gas contained 500 ppm NOx added as NO; 500 ppm $NH_3$; 5 vol % water and 10 vol % $O_2$ in nitrogen. Space velocity as GHSV was 80,000 $h^{-1}$. FIG. 1 indicates the importance of sodium content on the hydrothermal stability of a copper zeolite Y catalyst where low sodium levels resulted in improved NOx reduction efficiency after hydrothermal aging. Both fresh catalysts have similar copper loadings (~4.8 wt % CuO) and similar extra-framework aluminum contents but, differ in sodium content.

EXAMPLE 4

Catalyst C. Synthesis of Copper Zeolite Y. An ammonium form of a low sodium Y ($Na_2O<0.2$ wt %) was promoted with copper as follows:

A. 609.9 g of zeolite Y was added to 2531.7 g of an aqueous solution of copper (II) sulfate pentahydrate containing 0.3% by weight Cu (0.05 M Cu), with stirring to suspend the solids and disperse the lumps in a 4 liter Pyrex beaker.

B. With continued stirring, the slurry of Step A was heated to 80° C., for one hour, and then cooled. pH of the solution was not adjusted but was between 2.75 and 3.5 throughout the reaction.

C. The cooled slurry of Step B was vacuum filtered to separate the solids from the liquid, and the solids were washed with a volume of deionized water equal to the volume of the separated liquid.

D. The powder of Step C was dried for 4 hours at 90° C. in air to provide a copper promoted zeolite Y powder (CuY).

E. The CuY of Step D was reslurried (with continuous stirring) in the same copper solution as Step A before Step B through D was carried out again for a total of 5 exchanges for 1 hour each. The pH of each exchange was between 2.75 and 3.5 throughout each reaction.

F. Following the final exchange, the powder was dried for sixteen hours at 90° C. in air to provide a copper promoted zeolite Y powder (CuY).

G. The CuY of Step F was then calcined for 16 hours at 640° C. Chemical analysis showed that the CuY powder contained 4.4% by weight Cu (expressed as the metal oxide on a volatile free basis) and 0.1 wt. % $Na_2O$.

H. The calcined CuY was subsequently hydrothermally treated at 800° C. for 50 hours with 10% steam in air and designated Catalyst C.

EXAMPLE 5

Catalyst D. Synthesis of Copper Zeolite Y. An ammonium form of a low sodium Y ($Na_2O<0.2$ wt %) was promoted with copper as follows:

A. 12.6 kg of zeolite Y was added to 93.65 kg of an aqueous solution of copper (II) sulfate pentahydrate containing 1% by weight Cu (0.16 M Cu), with stirring to suspend the solids and disperse the lumps in a 150 liter reactor.

B. With continued stirring, the slurry of Step A was heated to 80° C., for one hour, and then cooled. pH of the solution was not adjusted but was between 3 and 3.5 throughout the reaction.

C. The cooled slurry of Step B was filtered through a filter press to separate the solids from the liquid, and the solids were washed with a volume of deionized water equal to the volume of the separated liquid.

D. The powder of Step C was dried for 4 hours at 90° C. in air to provide a copper promoted zeolite Y powder (CuY).

E. The CuY of Step D was reslurried (with continuous stirring) in the same copper solution as Step A before Step B through D was carried out again for a total of 2 exchanges. The pH of the second exchange was between 3 and 3.5 throughout each reaction.

F. Following the final exchange, the powder was dried for sixteen hours at 90° C. in air to provide a copper promoted zeolite Y powder (CuY).

G. The CuY of Step F was then calcined for 16 hours at 640° C. Chemical analysis showed that the CuY powder contained 4.3% by weight Cu (expressed as the metal oxide on a volatile free basis) and 0.1 wt % $Na_2O$.

H. The calcined CuY was subsequently hydrothermally treated at 800° C. for 50 hours with 10% steam in air and designated Catalyst D.

EXAMPLE 6

Figure 2:
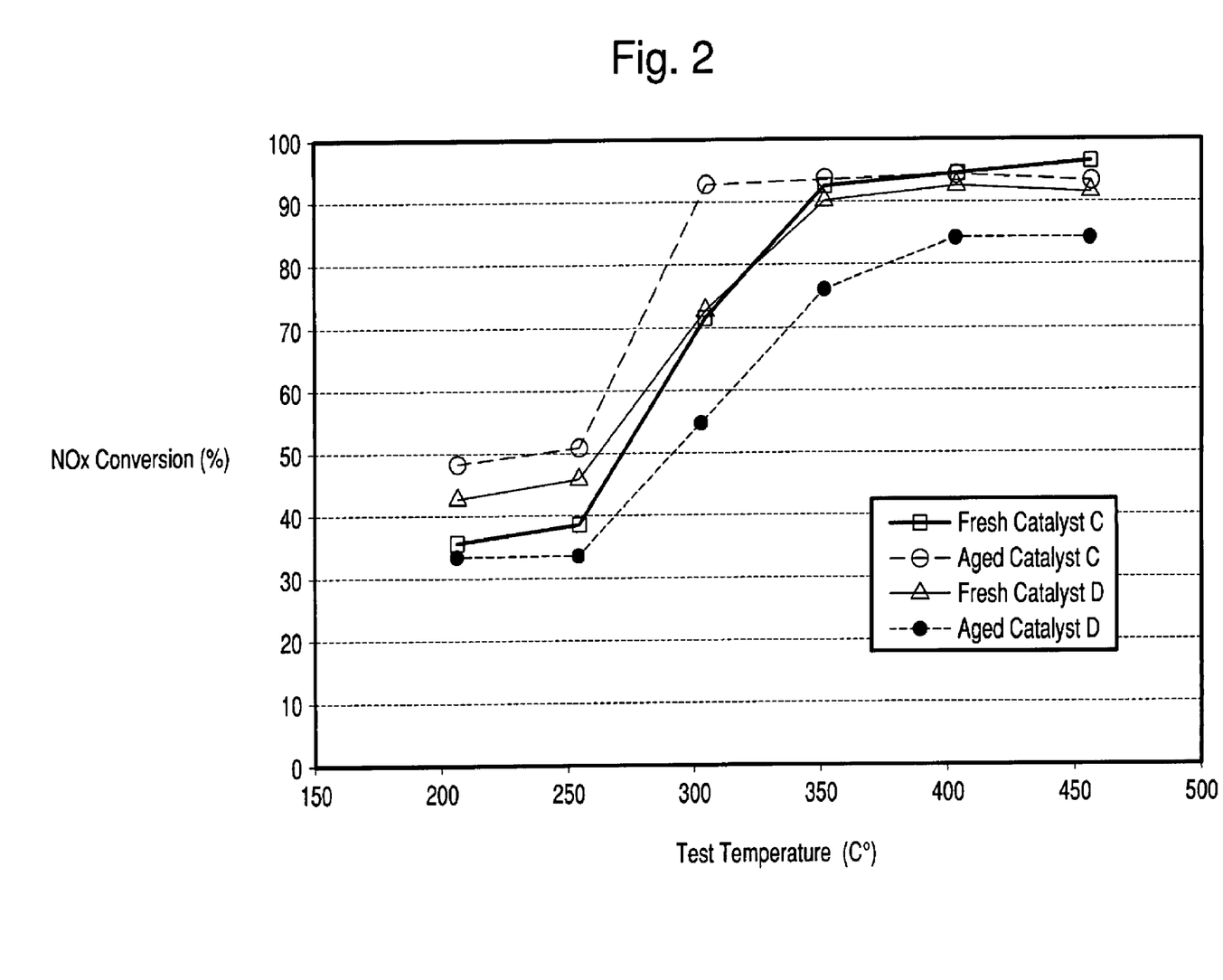
FIG. 2 is a comparison of two copper zeolite Y catalysts with differing amounts of aluminum located in the zeolitic pores.

The Copper zeolite catalysts of Examples 4 and 5 were used to coat honeycombs in an amount of about 2-2.5 g/in$^3$. The catalysts were then tested for $NH_3$ SCR reduction of NOx in a lab reactor. The feed gas contained 500 ppm $NO_x$ added as NO; 500 ppm $NH_3$; 5 vol % water and 10 vol % $O_2$ in nitrogen. Space velocity as GHSV was 80,000 h$^{-1}$. FIG. 2 indicates the importance of removal of extra-framework aluminum from zeolitic pores. Without removal of extra-framework aluminum we see deactivation of the catalyst on steam aging whereas we see improvement of the catalytic performance when extra-framework aluminum is removed from the zeolitic pores. The data generated from Examples 7 and 8 have been used to quantify undesirable levels of extra-framework aluminum residing in the zeolite pores. Table 1 shows x-ray diffraction (XRD) and x-ray photoelectron spectroscopy (XPS) data showing the limits on extra-framework aluminum for hydrothermal stability of the catalysts.

Zeolite Y has a chemical composition of $Na_{56}Al_{56}Si_{134}O_{384}$ where all the aluminum is part of the zeolitic framework. This provides a framework Al/Si of 0.42. The framework aluminum content for all other $NH_4$-materials is calculated from the unit cell using the method disclosed in "Determination of framework aluminum content in zeolites X, Y, and dealuminated Y using unit cell size," George T. Kerr, *Zeolites,* 1989, vol. 9, pp. 350-351 (July 1989), which is incorporated herein by reference, FAL=112.4*(unit cell−24.233), where FAL is the framework aluminum per unit cell.

We can now calculate how much Al/Si is due to extra-framework aluminum (EFA) via the following relationship: EFA=(Al/Si unit cell value for NaY—Al/Si unit cell value for studied material).

From a comparison of deactivated vs improved performance on our low Na CuY products it is apparent that a XPS Al/Si>0.5 provides a material with improved hydrothermal stability. This XPS Al/Si ratio equates to less than 65% of total non-framework aluminum being in the pores. This value also equates to <7.5 wt % $Al_2O_3$ which is non-framework residing in the pores.

Thus, XPS can be used to describe attributes for low sodium CuY materials prepared via methods that result in enrichment of Al at the surface of zeolite crystals such as the presently disclosed hydrothermal treatment. Methods that remove the EFA completely from the zeolite cannot use XPS for quantitative determination of extra-framework aluminum which remains in the micropores of the zeolite. Therefore, these materials will be characterized by a combination of unit cell data with chemical analysis. The amount of EFA<7.5 wt. % as outlined by our XPS example in Table 1 may be necessary for enhanced stability and hence improved performance on steam aging.

TABLE 1 x-ray diffraction (XRD) and x-ray photoelectron spectroscopy (XPS) data showing the limits on extra-framework aluminum for hydrothermal stability of the catalysts.

| Material | Unit Cell | Al per unit cell from XRD or chemical analysis | EFA Al from XRD | Si per Unit Cell | Framework Al/Si Unit Cell | Al/Si XPS | Number of EFAs per unit cell not in pores | % of total Al not in pores | Wt. % EFA ($Al_2O_3$) in pores |
|---|---|---|---|---|---|---|---|---|---|
| NaY | | 56.00 | 0.00 | 134.00 | 0.42 | 0.42 | 0.00 | 0.00 | 0.00 |
| Fresh Catalyst C | 24.43 | 22.14 | 33.86 | 134.00 | 0.17 | 0.75 | 44.62 | 79.68 | 0.00 |
| Aged Catalyst C | 24.34 | 12.03 | 43.97 | 134.00 | 0.09 | 0.67 | 46.35 | 82.77 | 3.12 |
| Fresh Catalyst D | 24.46 | 25.51 | 30.49 | 134.00 | 0.19 | 0.36 | 16.62 | 29.68 | 10.37 |
| Aged Catalyst D | 24.34 | 12.03 | 43.97 | 134.00 | 0.09 | 0.46 | 34.25 | 61.17 | 8.52 |
| Limits | 24.34 | 12.03 | 43.97 | 134.00 | 0.09 | 0.50 | 36.65 | 65.44 | 7.45 |

If XPS Al/Si is greater than 0.5 then greater than 65% of total aluminum resides outside the pores or less than 7.5 wt. % EFA ($Al_2O_3$) resides in the pores. This latter value can be used as a maximum limit for any treatment which removes EFA from the zeolite without surface enrichment (i.e., less than 7.5 wt. % EFA ($Al_2O_3$)).

EXAMPLE 7

Hydrothermal pre-treatment of zeolite Y. Hydrothermal dealumination of low sodium Y($Na_2O$<0.2 wt %) to remove extra-framework aluminum from the micropores. This method produced a sample with XPS Al/Si=0.58 and EFA calculated to be 5 wt. % $Al_2O_3$.

A. 2 kg of low sodium zeolite Y was steam treated at 760° C. in 40% steam for 4 hrs. This was carried out in a large steam vertical tube reactor.

B. The cooled sample was then retrieved from the reactor.

EXAMPLE 8

Acid leaching pre-treatment of zeolite Y. Acid leaching dealumination of low sodium Y ($Na_2O$<0.2 wt %) to remove extra-framework aluminum. Bulk $Al_2O_3$ from chemical analysis was 22.72 wt. % $Al_2O_3$ on a volatile free basis. Unit cell of 24.53 Å defined the framework aluminum content to be 14.8 wt. % $Al_2O_3$ on a volatile free basis. This method produced a sample with EFA calculated to be 2.08 wt. % $Al_2O_3$ which is less than the upper limit defined by the XPS examples.

A. 310 g of low sodium Y was added to 3.1 L deionized water. With continued stirring, the slurry of Step A was heated to 80° C.

B. Concentrated hydrochloric acid was added to adjust the pH to 2.5. The pH was maintained between 2.5 and 2.8 for 1 hour by addition of hydrochloric acid.

C. The slurry was vacuum filtered to separate the solids from the liquid, and the solids were washed with a volume of deionized water equal to the volume of the separated liquid.

D. The powder of Step C was dried for 4 hours at 90° C. in air.

E. The powder of Step D was reslurried (with continuous stirring) in the same deionized water as Step A before Step B through E were carried out again. The pH was controlled to be between 2.5 and 2.8 throughout the reaction.

EXAMPLE 9

Acid leaching pre-treatment of zeolite Y. Room temperature acid leaching dealumination of low sodium Y ($Na_2O$<0.2 wt %) to remove extra-framework aluminum. Bulk $Al_2O_3$ from chemical analysis was 22.72 wt. % $Al_2O_3$ on a volatile free basis. Unit cell of 24.53 Å defined the framework aluminum content to be 14.8 wt. % $Al_2O_3$ on a volatile free basis. This method produced a sample with EFA calculated to be 2.08 wt. % $Al_2O_3$ which is less than the upper limit defined by the XPS examples.

A. 310 g of low sodium Y was added to 3.1 L deionized water.

B. With continued stirring, concentrated hydrochloric acid was added to adjust the pH to 2.5. The pH was maintained between 2.5 and 2.8 for 24 hours by addition of hydrochloric acid.

C. The slurry was vacuum filtered to separate the solids from the liquid, and the solids were washed with a volume of deionized water equal to the volume of the separated liquid.

D. The powder of Step C was dried for 4 hours at 90° C. in air.

E. The powder of Step D was reslurried (with continuous stirring) in the same deionized water as Step A before Step B through E were carried out again. The pH was controlled to be between 2.5 and 2.8 throughout the reaction.

Examples 7-9 demonstrate methods whereby extra-framework aluminum was removed from the zeolite's micropores. In example 7 the extra-framework aluminum was removed from the microporosity to the external surface of the zeolite crystal. While in examples 8 and 9 the extra-framework aluminum species were completely removed from the zeolite as a soluble form.

What is claimed is:

1. A method of reducing NOx in an exhaust gas or flue gas stream with ammonia and oxygen by selective catalytic reduction, the method comprising contacting said exhaust gas or flue gas stream with a hydrothermally stable zeolite catalyst comprising a metal-promoted, low sodium zeolite, wherein said metal-promoted, low sodium zeolite has been treated to form extra-framework aluminum and remove a major portion of said extra-framework aluminum from zeolite pores.

2. The method of claim 1, wherein said metal-promoted, low sodium zeolite has a sodium content of less than 3 weight percent as $Na_2O$ following metal ion-exchange and is hydrothermally treated after metal ion-exchange to form the extra-framework aluminum and remove the major portion of the extra-framework aluminum from the zeolite pores.

3. The method of claim 1, wherein the method exhibits improved NOx reduction activity in selective catalytic reduction as compared to a method using a metal-promoted, low sodium zeolite catalyst not treated to form extra-framework aluminum and remove a major portion of said extra-framework aluminum from zeolite pores.

4. The method of claim 3, wherein the improved NOx reduction activity in selective catalytic reduction is at a temperature at or below 350° C.

5. The method of claim 1, further comprising converting greater than 50% of the NOx gases in the exhaust gas or flue gas stream at temperatures at or below about 250° C.

6. The method of claim 1, further comprising converting greater than 80% of the NOx gases in the exhaust gas or flue gas stream at temperatures at or below about 300° C.

7. The method of claim 1, wherein less than 65 wt. % of the total aluminum resides in the zeolite pores.

8. The method of claim 1, wherein said metal-promoted, low sodium zeolite is zeolite Y and said metal is copper.

9. The method of claim 1, wherein said metal-promoted, low sodium zeolite contains mesopores having a diameter in the range of 2 to 50 nm and said mesopores have a pore volume of at least 0.07 $cm^3/g$.

10. The method of claim 1, wherein said metal-promoted, low sodium zeolite contains a metal loading at the external surface of the zeolite from about 1 wt. % to about 10.0 wt. %, based on the weight of the metal-promoted, low sodium zeolite.

11. The method of claim 1, wherein said hydrothermally stable zeolite catalyst is coated onto a substrate.

12. The method of claim 1, wherein a major portion of the extra-framework aluminum has migrated to the external surface of said metal-promoted, low sodium zeolite.

13. The method of claim 1, wherein said metal-promoted, low sodium zeolite is treated by acid dealumination, steam dealumination or extraction of extra-framework aluminum with a complexing agent to remove the major portion of said extra-framework aluminum from the zeolite pores.

14. The method of claim 1, wherein said metal-promoted, low sodium zeolite is selected from the group consisting of zeolite Y, faujasites, ultra-stable Y, ZSM-3, ZSM-20, CSZ-1, ECR-30, LZ-210, zeolite L, ferrierite, MCM-22 and offretite.

15. The method of claim 1, wherein said metal-promoted, low sodium zeolite is promoted with a metal selected from the group consisting of metal ions of vanadium, chromium, manganese, iron, cobalt, nickel, copper and cerium.

16. The method of claim 1, wherein said metal-promoted, low sodium zeolite has a sodium content of less than 3.0 wt. % as $Na_2O$ following metal ion-exchange.

17. The method of claim 16, wherein the sodium content is less than 2.4 wt. % as $Na_2O$ following metal ion-exchange.

18. The method of claim 17, wherein the sodium content is less than 1.0 wt. % as $Na_2O$ following metal ion-exchange.

19. The method of claim 18, wherein the sodium content is less than 0.4 wt. % as $Na_2O$ following metal ion-exchange.

* * * * *